United States Patent
Camara et al.

(10) Patent No.: US 7,352,815 B2
(45) Date of Patent: Apr. 1, 2008

(54) DATA TRANSCEIVER AND METHOD FOR EQUALIZING THE DATA EYE OF A DIFFERENTIAL INPUT DATA SIGNAL

(75) Inventors: Hibourahima Camara, Wappingers Falls, NY (US); Joseph Natonio, Poughkeepsie, NY (US); Karl D. Selander, Hopewell Junction, NY (US); Michael A. Sorna, Hopewell Junction, NY (US); Jeremy K. Stephens, Ossining, NY (US); Daniel W. Storaska, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 10/604,025

(22) Filed: Jun. 23, 2003

(65) Prior Publication Data

US 2004/0258166 A1    Dec. 23, 2004

(51) Int. Cl.
*H04B 3/00* (2006.01)

(52) U.S. Cl. ............... 375/257; 234/232; 234/350; 234/355; 234/224; 234/285; 234/214; 326/26; 326/27; 326/86; 714/704; 714/47

(58) Field of Classification Search ............... 375/257, 375/234, 232, 350, 355, 224, 285, 214; 326/26, 326/27, 86; 714/704, 47
See application file for complete search history.

(56) References Cited

U.S. PATENT DOCUMENTS

| | | | |
|---|---|---|---|
| 4,569,059 A * | 2/1986 | Fish | 375/257 |
| 5,105,440 A | 4/1992 | Huellwegen | |
| 5,210,774 A | 5/1993 | Abbiate et al. | |
| 5,483,552 A | 1/1996 | Shimazaki et al. | |
| 6,167,080 A | 12/2000 | Hee et al. | |
| 6,295,323 B1 | 9/2001 | Gabara | |
| 6,570,406 B2 * | 5/2003 | Tang et al. | 326/86 |
| 6,731,683 B1 * | 5/2004 | Fiedler et al. | 375/232 |
| 2003/0043900 A1 * | 3/2003 | Deas et al. | 375/234 |

* cited by examiner

*Primary Examiner*—Chieh M. Fan
*Assistant Examiner*—Eva Puente
(74) *Attorney, Agent, or Firm*—RatnerPrestia

(57) ABSTRACT

Apparatus and method for counteracting high frequency attenuation of a differential input data signal as the signal is conducted through a data link. A differential input data signal is transmitted from a transmitter to a receiver through a data link. The data eye of the differential input data signal is modified at the transmitter in response to feedback from the receiver where the extent of the data eye of the differential input data signal, after being conducted through the data link, is determined. The feedback to the transmitter, dependent on the determination of the extent of the data eye, controls the data eye at the transmitter and the equalization of the differential input data signal by adapting the differential input data signal to anticipate high frequency attenuation of the differential input data signal in the data link.

8 Claims, 4 Drawing Sheets

DATA TRANSCEIVER AND METHOD FOR EQUALIZING THE DATA EYE OF A DIFFERENTIAL INPUT DATA SIGNAL

TECHNICAL FIELD

The present invention relates, in general, data communications and, in particular, to an apparatus and method for counteracting the effect of high frequency attenuation that can arise as data is conducted through a less than ideal channel.

BACKGROUND OF THE INVENTION

In high speed serial data communications links, there are losses in signal integrity as data is transmitted and received through a less than ideal channel. For example, a data signal traveling through a cable must eventually pass onto a line card via an SMA connector, onto an fr4 or getek trace, through a packaging and finally onto a SERDES (serializer/deserializer) transceiver (i.e., a transmitter/receiver pair) that converts data received in serial format to data in parallel format. Another example is the propagation of a signal from one line card to another, first passing through a Tyco or Teradyne connector, onto a getek backplane (analogous to a "mother" board) and back again. As the signal propagates through these media, it experiences losses through non-ideal transmission line effects as well as lumped parasitic elements at the interfaces that act to attenuate high frequency components and distort the signal. The result is an increase in jitter, which closes the periodic valid data window, known as the data eye. The data eye provides a measure of the quality of the channel and the quality of the SERDES. The Bit Error Rate (BER) increases as the data eye closes.

High speed serial data communications links, in which such losses in signal integrity occur, have been arranged to counteract the effect of high frequency attenuation and improve the signal integrity as data is transmitted and received through a less than ideal channel. Generally, the data transmitter has circuitry that amplifies the high frequency content of the data being transferred into the channel more than the amplification of the low frequency content of the data being transferred into the channel. The degree of amplification of each frequency component of the data signals is controllable.

In practice, several different lengths of cable and/or lengths of backplane are characterized to determine the optimum settings for the amount of correction performed by the transceiver to result in minimum jitter. Customers are given information about these settings. The SERDES transceiver can be placed into the system and the transmitted data eye, at a given point within the system, optimized by manual manipulation of the control and observation of the data eye. These settings then are applied to all of the same SERDES units for this application.

The techniques used in the past and described generally above involve an "equalization" function that can be characterized as "preset" equalization. Because preset equalization requires the setting of each unit, preset equalization is considered less than desirable in certain applications.

SUMMARY OF THE INVENTION

It is an object of the present invention to provide a new and improved apparatus and method for equalizing the data eye of differential data signals.

It is another objective of the present invention to provide an apparatus and method that equalize the data eye of differential data signals by sensing the integrity of the signal and overcoming a loss in integrity by controlling the equalization according the sensed integrity.

To achieve these and other objectives, in the present invention, a differential input data signal is transmitted from a transmitter to a receiver through a data link. The data eye of the differential input data signal is modified at the transmitter in response to feedback from the receiver where the extent of the data eye of the differential input data signal, conducted through the data link, is determined. The feedback to the transmitter, dependent on the determination of the extent of the data eye, controls the data eye at the transmitter and the equalization of the differential input data signal.

BRIEF DESCRIPTION OF THE DRAWING

The present invention is best understood from the following detailed description when read in conjunction with the accompanying drawings.

DETAILED DESCRIPTION OF THE INVENTION

Figure 1:
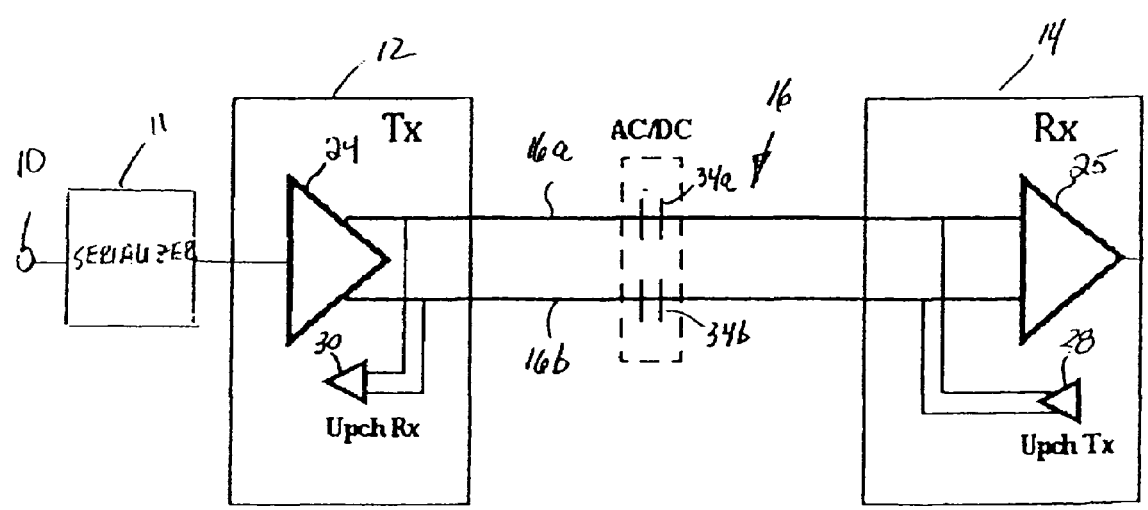
FIG. 1 is a diagram of a high speed serial data transceiver constructed in accordance with the present invention.
Figure 2:
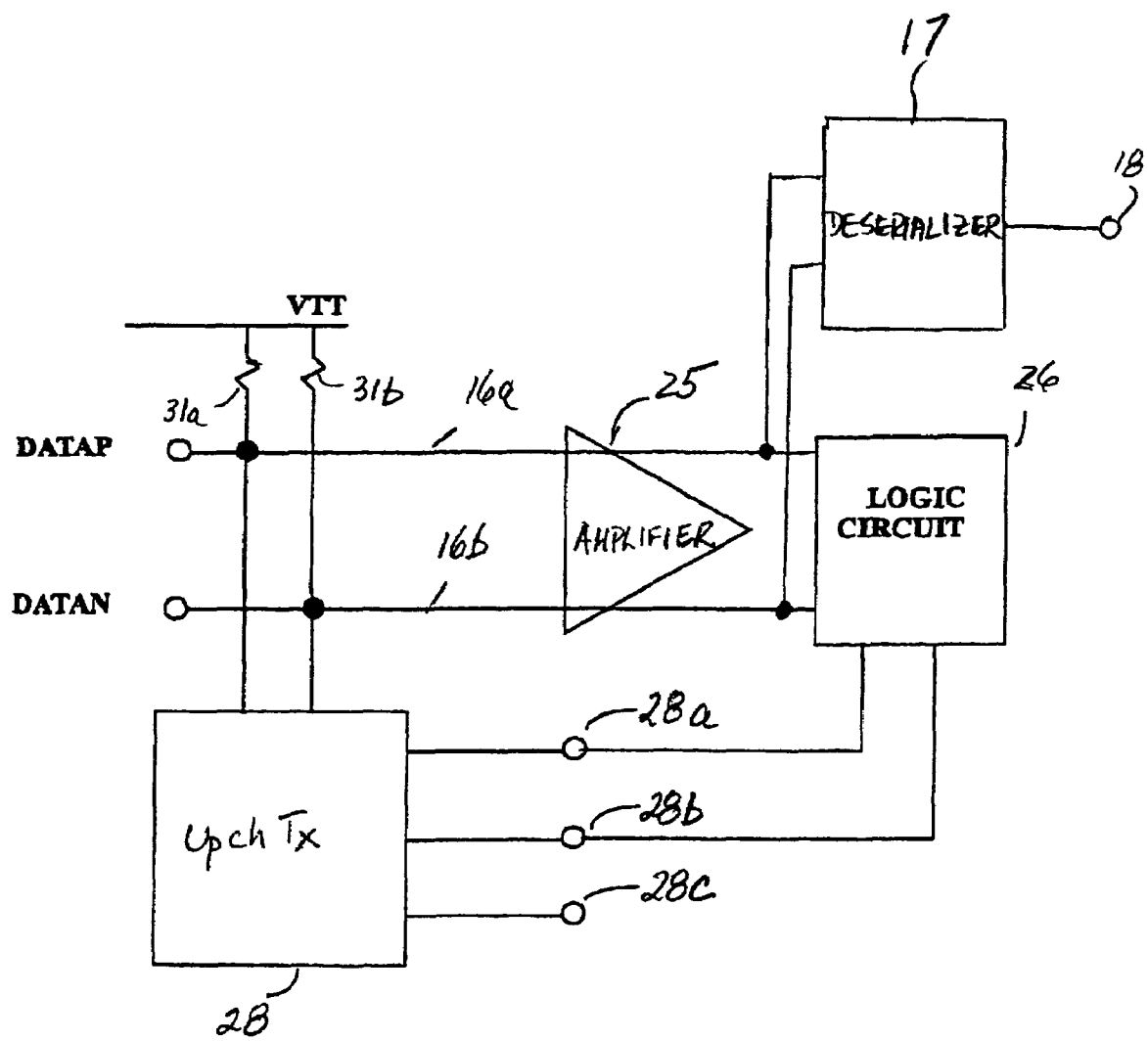
FIG. 2 is a diagram of the components of the receiver portion of the FIG. 1 transceiver and components associated with the receiver portion of the transceiver.
Figure 3:
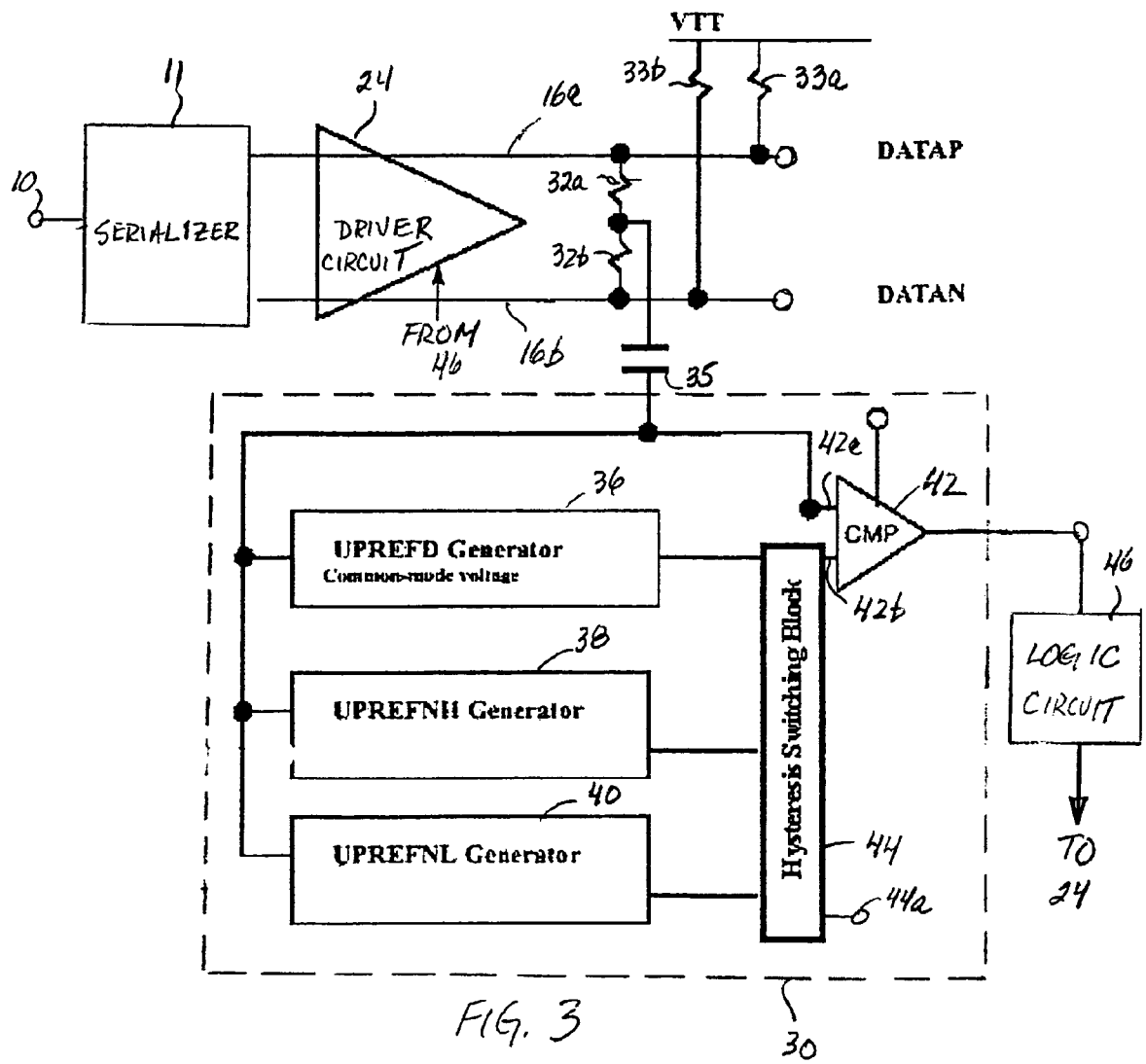
FIG. 3 is a diagram of the components of the transmitter portion of the FIG. 1 transceiver and components associated with the transmitter portion of the transceiver.

Referring to FIGS. 1, 2, and 3, a data transceiver, constructed in accordance with the present invention, includes input means for supplying a differential input data signal. Such means are represented by an input terminal 10 and a serializer 11. Input terminal 10 represents, for example, a FIFO associated with any of the following circuits/systems: a memory cache (DRAM/SRAM), a microprocessor, a portion of a switching fabric (switch in a router). For the embodiment of the invention being described, the input at terminal 10 is in parallel format and is serialized by serializer 11. If the input at terminal 10 is single-ended, serializer 11 also forms the differential signal. Otherwise, if the input at terminal 10 is differential, serializer 11 only serializes the input.

A data transceiver, constructed in accordance with the present invention, also includes a transmitter 12 (Tx), a receiver 14 (Rx), and a data link 16 between the transmitter and the receiver. The differential input data signal is conducted from transmitter 12 through data link 16 to receiver 14.

Output means, represented by a deserializer 17 and an output terminal 18, receive the differential input data signal from receiver 14. Output terminal 18 represents, for example, a FIFO associated with any of the following circuits/systems: a memory cache (DRAM/SRAM), a microprocessor, a portion of a switching fabric (switch in a router). For the embodiment of the invention being described, the output at terminal 18 is to be in parallel format, so deserializer 17 deserializes the differential input data signal. If the output at terminal 18 is to be single-ended, deserializer 17 also forms the single-ended signal. Otherwise, if the output at terminal 18 is to be differential, deserializer 17 only deserializes the differential input data signal.

Data link 16 conducts the serialized differential input data signal from transmitter 12 to receiver 14. Data link 16 includes a first line 16a for conducting the data positive signal of the differential input data signal and a second line 16b for conducting the data negative signal of the differential input data signal.

Transmitter 12 also includes a driver circuit 24 for receiving the serialized differential input data signal from serializer 11. Driver circuit 24 is an amplifier having a variable, frequency-selective gain and can be, for example, a finite impulse response driver that is arranged to be controlled, as will be explained below, to effect equalization, as needed, of the serialized differential input data signal. Receiver 14 also includes an amplifier 25 for receiving and amplifying the serialized differential input data signal conducted by data link 16. It should be noted that forming the differential input data signal from a single-ended input at input terminal 10 can be done by driver circuit 24 rather than by serializer 11 and that a single-ended output at output terminal 18 can be formed from the differential input data signal by amplifier 25 rather than by deserializer 11.

Receiver 14 receives the serialized differential input data signal from transmitter 12 and determines the extent of the data eye of the serialized differential input data signal and develops a feedback signal in response to the determination of the extent of the data eye of the serialized differential input data signal. The feedback signal is conducted from receiver 14 to transmitter 12 by data link 16. Transmitter 12 receives the feedback signal from receiver 14 to equalize the data eye of the serialized differential input data signal and equalizes the data eye of the serialized differential input data signal in response to the feedback signal.

Receiver includes means responsive to the serialized differential input data signal for measuring the Bit Error Rate of the serialized differential input data signal and calculating, from the measurement of the Bit Error Rate, the degree of the equalization needed to produce a desired data eye for the serialized differential input data signal. Such means include, for the embodiment of the invention being described, a logic circuit 26 which controls an up channel transmitter 28 (UpchTX) to develop, from the calculation of the degree of the equalizer on needed to produce a desired data eye for the serialized differential input data signal, the feedback signal that is conducted through data link 16 to an input channel receiver 30 (UpchRx) in receiver 14. The Bit Error Rate of the serialized differential input data signal is measured by logic circuit 26 at selected sampling points across the data eye of the serialized differential data signal in time. Measurement of the amplitude of the data eye also can be included in determining the degree of equalization need to produce the desired data eye. The feedback signal that is conducted to data link 16 from up channel transmitter 28, herein referred to as the common mode signal, is a single-ended string of "0"s and "1"s.

Logic circuit 26 controls up channel transmitter 28, through a first input terminal 28a of the up channel transmitter, to enable up channel transmitter 28 to signal up channel receiver 30 that equalization of the serialized differential input data signal is necessary and, through a second input terminal 28b of the up channel transmitter, with information about the degree of equalization that is necessary. The characteristics of up channel transmitter 28 (e.g., frequency, amplitude, slew rate) are controlled by information supplied to the up channel transmitter through a third input terminal 28c of the up channel transmitter. It should be noted that logic circuit 26 can be arranged to function with a single-ended input rather than a differential input as illustrated. Differential operation is preferred to avoid common mode noise.

Resistors 31a and 31b in receiver 14 are connected between a power supply VTT and lines 16a and 16b, respectively, of the data link. These two resistors serve to terminate the serialized differential input data signal received by receiver 14 to the system reference impedance. The voltage of this power supply VTT becomes the common mode voltage for amplifier 25 and can be adjusted for optimal performance of the amplifier.

Transmitter 12 includes means responsive to the common mode signal for generating three reference signals. A single-ended input of the common mode signal is derived from both lines 16a and 16b of data link 16 at the junction of two resistors 32a and 32b connected between lines 16a and 16b of data link 16. Resistors 32a and 32b act to isolate the loading of up channel receiver 30 from data link 16.

Resistors 33a and 33b in transmitter 12 are connected between a power supply VTT and lines 16a and 16b, respectively. The voltage of this power supply VTT becomes the common mode single voltage for driver circuit 24 and can be adjusted for optimal performance of the driver circuit.

When DC blocking capacitors 34a and 34b are placed in data link 16, the VTT power supply at each of transmitter 12 and receiver 14 can be different, allowing for optimal performance of driver circuit 24 in transmitter 12 and amplifier 25 in receiver 14.

The common mode signal is passed through a DC blocking capacitor 35 in transmitter 12 to up channel receiver 30 and, in particular, to three reference generators 36, 38 and 40 in the up channel receiver. Passing the common mode signal through DC blocking capacitor 35 allows for the quiescent voltage point of up channel receiver 30 to be different from and independent of the common mode signal voltage. To filter out-of-band noise, the common mode signal passes to reference generators 36, 38, and 40 that act as low pass filters to remove frequency components from an order of magnitude below the frequency range of the common mode signal.

A first reference signal, generated by reference generator 36 (UPREFD Generator) is representative of the voltage level of the slow moving average, long-term common mode of the serialized differential input data signal. A second reference signal, generated by reference generator 38 (UPREFNH Generator), is representative of a voltage level a prescribed amount above the average common mode (i.e., the upper threshold) of the serialized differential input data signal. A third reference signal, generated by reference generator 40 (UPREFNL Generator), is equal and opposite to the second reference signal and is representative of a voltage level a prescribed amount below the average common mode (i.e., the lower threshold) of the serialized differential input data signal.

Figure 4:
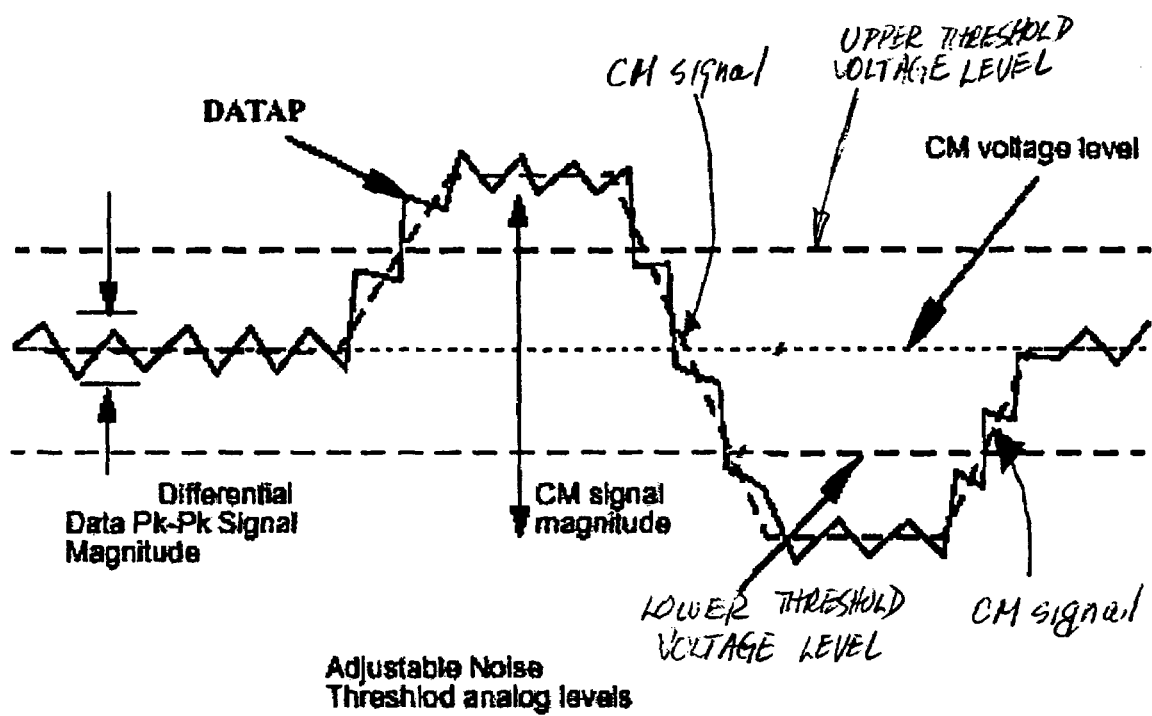
FIG. 4 shows waveforms of signals transmitted through a transceiver constructed in accordance with the present invention.

The average common mode voltage level (reference signal from reference generator 36), the upper threshold voltage level (reference signal from reference generator 38), and the lower threshold voltage level (reference signal from reference generator 40) are shown in FIG. 4 and identified accordingly. Also shown in FIG. 4, as the lower frequency, large amplitude waveform, is the common mode signal that, when averaged over a long term, is the dashed line common mode voltage level. The small amplitude, higher frequency waveform riding on the common mode signal is the DATAP (positive) signal of the differential input data signal. The DATAN (negative) signal of the differential input data signal has been omitted from FIG. 4 for purposes of clarity but would ride on the common mode signal and be equal and opposite to the DATAP (positive) signal.

Up channel receiver 30 in transmitter 12 also includes a comparator 42 that receives, at a first input 42a, the common mode signal and, at a second input 42b, the average common mode voltage level reference that is coupled to input 42b through a hysteresis switching block 44. Because all frequencies an order of magnitude below the common mode signal frequency range are common to both inputs, comparator 42 rejects them as common mode signals. The frequency response of comparator 42 is designed to roll off an order of magnitude above the frequency range of the common mode signal, such that high frequency noise is filtered out through the comparator. In this way, the low frequency noise and the high frequency noise is eliminated from the common mode signal and the circuitry acts as a band pass filter and signal detector.

In one mode of operation, the average common mode voltage level reference from reference generator 36 is conducted to input 42b of comparator 42. The common mode signal input to input 42a of comparator 42 is compared to this reference voltage to determine the polarity of the common mode signal. In a second mode of operation, in band noise can be mitigated by hysteresis within comparator 42 by alternately coupling the upper threshold voltage level reference from reference generator 38 and the lower threshold voltage level reference from reference generator 40 to input 42b of the comparator. When the common mode signal, conducted to input 42a of comparator 42 goes high, the lower threshold voltage level reference is coupled to input 42b by hysteresis switching block 44 and when the common mode signal goes low, the upper threshold voltage level reference is coupled to input 42b by the hysteresis switching block. In this way, in-band noise present on the common mode signal must be of an amplitude to cause the common mode signal voltage to fall below the lower threshold voltage level reference when the common mode signal is high, or rise above the upper threshold voltage level reference when the common mode signal is low. This second mode of operation is selected by information supplied to a terminal 44a of hysteresis switching block 44.

The feedback signal, in the form on a single-ended string of "0"s and "1"s, developed by up channel transmitter 28 is conducted to input 42a of comparator 42 which, depending on the reference signal coupled to input 42b of the comparator, develops a first difference signal representative of the difference between the first reference signal and the feedback signal, a second difference signal representative of the difference between the second reference signal and the feedback signal, or a third difference signal representative of the difference between the third reference signal and the feedback signal. Comparator 42 compares the amplitude of the feedback signal with the reference signals coupled to input 42b of the comparator. If both the "0"s and "1"s of the feedback signal that is conducted to input 42a of comparator 42 are below the reference signal conducted to input 42b of the comparator, both the "0"s and the "1"s are registered as a "0". If both the "0"s and "1"s of the feedback signal are above the reference signal, both the "0"s and the "1"s are registered as a "1". Thus, the reference voltage levels produced by the reference generators and introduced to input 42b are designed to be between the "0" and "1" values of the feedback signal.

Receiver 14 also includes means responsive to the difference signals developed by comparator 42 for controlling the amplification of driver circuit 24 to alter the data eye of the serialized different input data signal to counteract the effect of high frequency attenuation and improve the signal integrity. Such means, for the embodiment of the invention being described, include a logic circuit 46 that converts the output from comparator 42 in suitable form for controlling the gain, on a frequency-selective basis, of driver circuit 24. The degree of amplification of each frequency component of the differential input data signal is controllable by the output of logic circuit 46.

Although the invention is illustrated and described herein with reference to certain exemplary embodiments, the present invention, nevertheless, is not intended to be limited to the details shown and described. Rather, various modifications may be made to those exemplary embodiments within the scope and range of equivalents of the claims without departing from the invention.

We claim:

1. A data transceiver comprising:
input means for supplying a differential input data signal;
a transmitter;
a receiver;
a data link between said transmitter and said receiver; and
output means for receiving a differential output data signal;
said transmitter for:
(a) receiving the differential input data signal from said input means,
(b) receiving a feedback signal from said receiver, and
(c) equalizing, in response to the received feedback signal, a data eye of the differential input data signal;
said receiver for:
(a) receiving the differential input data signal from said transmitter,
(b) determining an extent of the data eye of the differential input data signal,
(c) developing the feedback signal in response to the determination of the extent of the data eye of the differential input data signal; and
(d) supplying the differential output signal to said output means, and
said data link for conducting:
(a) the differential input data signal from said transmitter to said receiver, and
(b) the feedback signal from said receiver to said transmitter, and
including:
(a) a first line for conducting the data positive signal of the differential input data signal, and
(b) a second line for conducting the data negative signal of the differential input data signal,
(a) said input means include a serializer for developing from an input in parallel format the differential input data signal and supplying the differential input data signal to said transmitter in serial format,
(b) said output means include a deserializer for receiving from said receiver the serialized differential input data signal and developing from the serialized differential input data signal an output in serial format, and
(c) said data link conducts the serialized differential input data signal from said transmitter to said receiver,
(a) said receiver further includes means responsive to the serialized differential input data signal for:

(1) measuring a Bit Error Rate of the serialized differential input data signal,
(2) calculating, from the measurement of the Bit Error Rate, the degree of the equalization needed to produce a desired data eye for the serialized differential input data signal,
(3) developing, from the calculation of the degree of the equalization needed to produce a desired data eye for the serialized differential input data signal, the feedback signal, and
(4) conducting the feedback signal to said data link, and
(b) said transmitter further includes:
(1) means for generating a reference signal related to the common mode of the serialized differential input data signal,
(2) means for comparing the reference signal with the feedback signal to develop a difference signal representative of the difference between the reference signal and the feedback signal,
(3) a driver circuit having a variable, frequency-selective gain to which the serialized differential input data signal is conducted, and
(4) means responsive to the difference signal for controlling the amplification of said driver circuit to alter the data eye of the serialized differential input data signal.

2. A data transceiver comprising:
input means for supplying a differential input data signal;
a transmitter;
a receiver;
a data link between said transmitter and said receiver; and
output means for receiving a differential output data signal;
said transmitter for:
(a) receiving the differential input data signal from said input means,
(b) receiving a feedback signal from said receiver, and
(c) equalizing, in response to the received feedback signal, a data eye of the differential input data signal;
said receiver for:
(a) receiving the differential input data signal from said transmitter,
(b) determining an extent of the data eye of the differential input data signal,
(c) developing the feedback signal in response to the determination of the extent of the data eye of the differential input data signal; and
(d) supplying the differential output signal to said output means, and
said data link for conducting:
(a) the differential input data signal from said transmitter to said reviver, and
(b) the feedback signal from said receiver to said transmitter, and
including:
(a) a first line for conducting the data positive signal of the differential input data signal, and
(b) a second line for conducting the data negative signal of the differential input data signal,
(a) said input means include a serializer for developing from an input in parallel format the differential input data signal and supplying the differential input data signal to said transmitter in serial format,
(b) said output means include a deserializer for receiving from said receiver the serialized differential input data signal and developing from the serialized differential input data signal an output in serial format, and
(c) said data link conducts the serialized differential input data signal from said transmitter to said receiver,
(a) said reviver further includes means responsive to the serialized differential input data signal for:
(1) measuring a Bit Error Rate of the serialized differential input data signal,
(2) calculating the degree of the equalization needed to produce a desired data eye for the serialized differential input data signal,
(3) developing, from the calculation of the degree of the equalization needed to produce a desired data eye for the serialized differential input data signal, the feedback signal, and
(4) conducting the feedback signal to said data link, and
(b) said transmitter further includes:
(1) means responsive to a common mode signal representative of the common mode of the serialized differential input data signal for generating:
(i) a first reference signal representative of the level of the average common mode of the serialized differential input data signal,
(ii) a second reference signal representative of a level of prescribed amount above the average common mode of the serialized differential input data signal, and
(iii) a third reference signal, equal and opposite to the second reference signal, representative of a level a prescribed amount below the average common mode of the serialized differential input data signal,
(2) means for comparing the reference signals with the feedback signal to develop:
(i) a first difference signal representative of the difference between the first reference signal and the feedback signal,
(ii) a second difference signal representative of the difference between the second reference signal and the feedback signal, and
(iii) a third difference signal representative of the difference between the third reference signal and the feedback signal,
(3) means for selectively coupling:
(i) the first reference signal to said comparing means, and
(ii) the second reference signal and the third reference signal alternatively to said comparing means,
(4) a driver circuit having a variable, frequency-selective gain to which the serialized differential input data signal is conducted, and
(5) means responsive to the difference signals for controlling the amplification of said driver circuit to alter the data eye of the serialized differential input data signal.

3. A data transceiver according to claim 2 wherein the Bit Error Rate of the serialized differential input data signal is measured at selected sampling points across the data eye of the serialized differential data signal in time.

4. A data transceiver according to claim 3 wherein the amplitude of the data eye of the serialized differential input data signal is measured with the Bit Error Rate of the serialized differential input data signal to calculate the degree of the equalization needed to produce a desired data eye for the serialized differential input data signal.

5. A method of equalizing a data eye of a differential input data signal conducted from a first location to a second location through a data link, said method comprising the steps of:
   supplying a differential input data signal to a first location;
   conducting the differential input data signal from the first location to a second location through a data link;
   determining, at the second location, an extent of the data eye of the differential input data signal;
   developing, at the second location and from the determination of the extent of the data eye of the differential input data signal, an indication of the degree of the equalization needed to produce a desired data eye for the differential input data signal;
   conducting, from the second location to the first location, the developed indication of the degree of the equalization;
   equalizing, at the first location and in response to the indication of the degree of the equalization needed to produce a desired data eye for the differential input data signal, the data eye of the differential input data signal; and
   supplying the differential input data signal from the second location,
   serializing an input in parallel format to produce the differential input data signal supplied to the first location, and
   deserializing the serialized differential input data signal supplied from the second location to produce an output in parallel format,
      (a) the step of determining the extent of the data eye of the differential input data signal includes measuring the Bit Error Rate of the serialized differential input data signal,
      (b) the step of developing an indication of the degree of the equalization needed to produce a desired data eye for the differential input data signal includes calculating, from the measurement of the Bit Error Rate, the degree of the equalization needed to produce a desired data eye for the serialized differential input data signal, and
      (c) the step of equalizing the data eye of the differential input data signal includes:
         (1) generating a reference related to the common mode of the serialized differential input data signal,
         (2) comparing the reference with the indication of the degree of the equalization needed to produce a desired data eye for the differential input data signal, and
         (3) altering the data eye of the serialized differential input data signal according to the difference between the reference and the indication of the degree of the equalization needed to produce a desired data eye for the differential input data single.

6. A method of equalizing a data eye of a differential input data signal from a first location to a second location through a data link, said method comprising the steps of:
   supplying a differential input data signal to a first location;
   conducting the differential input data signal from the first location to a second location through a data link;
   determining, at the second location, an extent of the data eye of the differential input data signal;
   developing, at the second location and from the determination of the extent of the data eye of the differential input data signal, an indication of the degree of the equalization needed to provide a desired data eye for the differential input data signal;
   conducting, from the second location to the first location, the developed indication of the degree of the equalizion;
   equalizing, at the first location and in response to the indication of the degree of the equalization needed to produce a desired data eye for the differential input data signal, the data eye of the differential input data signal; and
   supplying the differential input data signal from the second location,
      (a) serializing an input in parallel format to produce the differential input data signal supplied to the first location, and
      (b) deserializing the serialized differential input data signal supplied from the second location to produce an output in parallel format,
      (a) the step of determining the extent of the data eye of the differential input data signal includes measuring the Bit Error Rate of the serialized differential input data signal,
      (b) the step of developing an indication of the degree of the equalization needed to produce a desired data eye for the differential input data signal includes calculating, from the measurement of the Bit Error Rate, the degree of the equalization needed to produce a desired data eye for the serialized differential input data signal,
      (c) the step of equalizing the data eye of the differential input data signal includes:
         (1) generating:
            (i) a first reference representative of the level of the average common mode of the serialized differential input data signal,
            (ii) a second reference representative of a level a prescribed amount above the average common mode of the serialized differential input data signal, and
            (iii) a third reference, equal and opposite to the second reference, representative of a level a prescribed amount below the average common mode of the serialized differential input data signal,
         (2) selectively comprising the references with the indication of the degree of the equalizion needed to produce a desired data eye for the differential input data signal, and
         (3) altering the data eye of the serialized differential input data signal according to:
            (i) the difference between the first reference and the indication of the degree of the equalization needed to produced a desire data eye for the differential input data signal,
            (ii) the difference between the second reference and the indication of the degree of the equalization needed to produce a desired data eye for the differential input data signal,
            (iii) the difference between the third reference and the indication of the degree of the equalization needed to produce a desired data eye for the differential input data signal.

7. A method of equalizing the data eye of a differential input data signal according to claim 6 wherein the Bit Error Rate of the serialized differential input data signal is measured at selected sampling points across the data eye of the serialized differential data signal in time.

8. A method of equalizing the data eye of a differential input data signal according to claim 7 wherein the amplitude of the data eye of the serialized differential input data signal is measured with the Bit Error Rate of the serialized differential input data signal to calculate the degree of the equalzation needed to produce a desired data eye for the serialized differential input data signal.

* * * * *